No. 722,261. PATENTED MAR. 10, 1903.
S. R. STEWART.
COMBINED HARROW AND CULTIVATOR.
APPLICATION FILED JUNE 21, 1902.
NO MODEL.
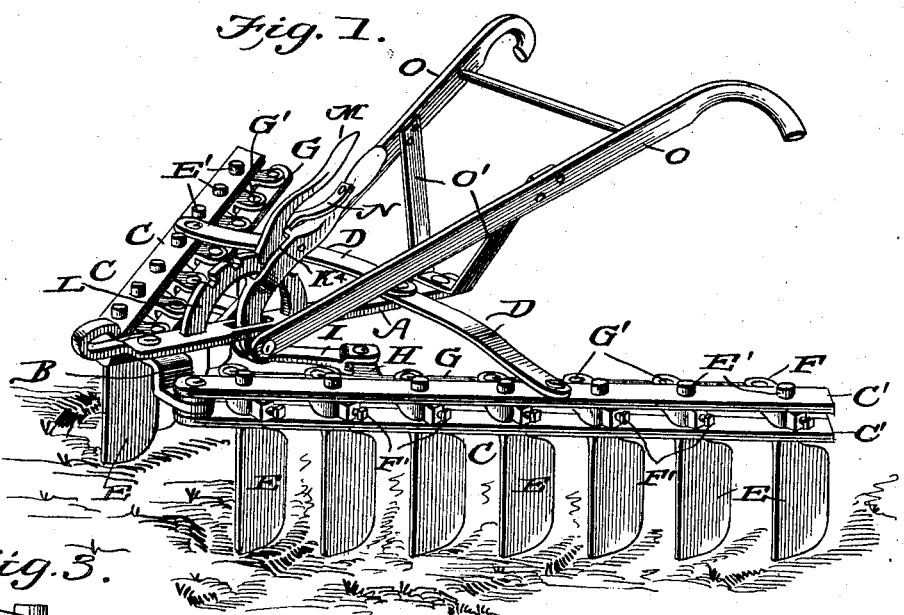
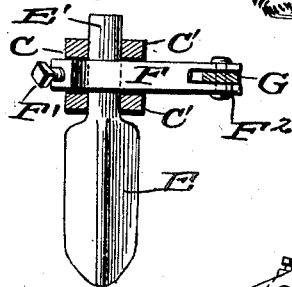
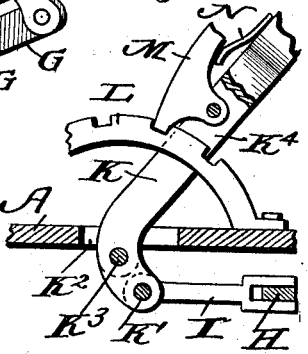
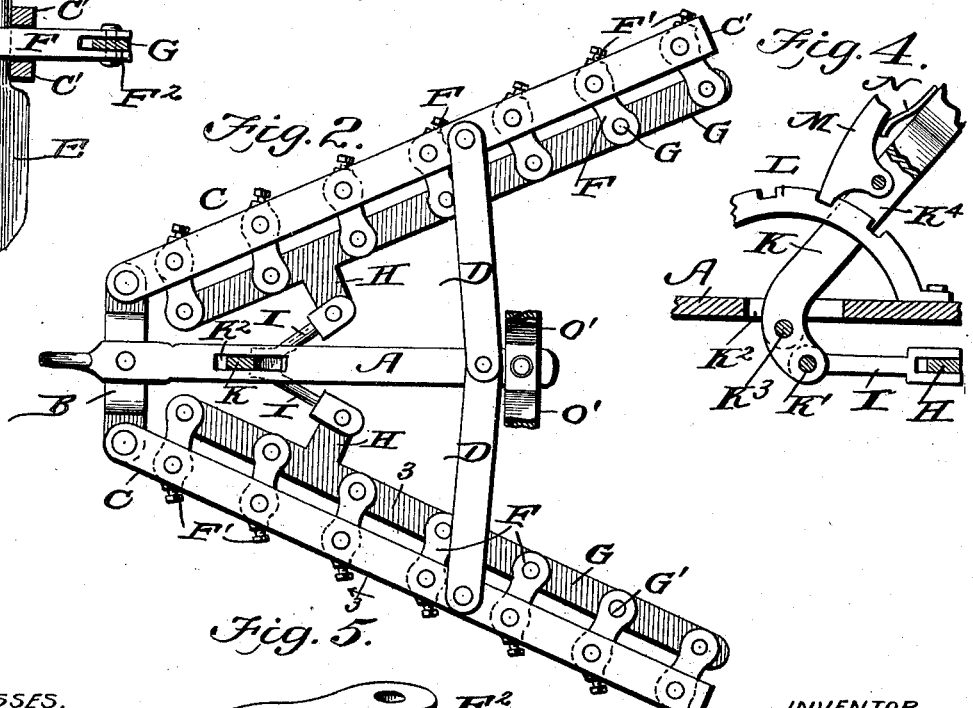
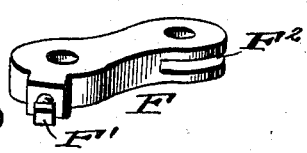
WITNESSES.
M. D. Blondel
Stewart Shaw
INVENTOR
S. R. Stewart.
BY
ATTORNEYS.

UNITED STATES PATENT OFFICE.

SAMUEL R. STEWART, OF COOPER HEIGHTS, GEORGIA.

COMBINED HARROW AND CULTIVATOR.

SPECIFICATION forming part of Letters Patent No. 722,261, dated March 10, 1903.

Application filed June 21, 1902. Serial No. 112,676. (No model.)

*To all whom it may concern:*

Be it known that I, SAMUEL R. STEWART, a citizen of the United States, residing at Cooper Heights, in the county of Walker and State of Georgia, have invented a new and useful Combined Harrow and Cultivator, of which the following is a specification.

This invention is a combined harrow and cultivator, the object being to provide a simple and efficient combination device capable of a quick and easy adjustment whereby not only the width of the space cultivated can be increased or decreased at will, but also the furrow which each individual plow cuts may be increased or diminished simultaneous with the increase of the width of the cultivator and harrow as a whole.

With these objects in view the invention consists in the peculiar construction of the several parts and their novel combination and arrangement, all of which will be fully described hereinafter and pointed out in the claims.

In the drawings forming a part of this specification, Figure 1 is a perspective view of a cultivator constructed in accordance with my invention. Fig. 2 is a top plan view partly in section. Fig. 3 is a section on the line 3 3 of Fig. 2. Fig. 4 is a sectional detail view illustrating the manner of locking the adjusting-lever, and Fig. 5 is a detail perspective view of one of the arms connected to the shank of the cultivator-shovel.

In carrying out my invention I employ a main or central beam A, having a cross-beam B connected thereto at its forward end, said cross-beam having the side beams C pivotally connected at its opposite ends, said side beam C consisting of each of the parallel upper and lower pieces C', as most clearly shown in Figs. 1 and 3.

Brace-beams D extend from the rear portion of the central beam A to approximately the central portion of the side beams C. As stated before, each side beam is composed of two members, the upper and lower one; but it will of course be understood that one member only may be employed, if so desired. Cultivator-teeth E have a shank E', which projects upwardly through the members C' of the side beams, there being a series of teeth connected to each side beam, and between the members C' an arm F is attached to the shank E' by means of a set-screw F', the inner ends of said arms being bifurcated, as shown at F², for the purpose of receiving the shifting bars G, the arms and bars being pivotally connected by means of bolts G'. Each shifting bar G has an inwardly-projecting extension H, to which is pivotally connected the link I, the said links being pivotally connected at their forward ends to the lower end of a lever K, as shown at K' in Fig. 4, said lever passing through a slot K², produced in the central beam A, and being pivoted at K³ between depending lugs formed integral with the under side of the central beam A. This lever K has a longitudinal opening K⁴ to permit the lever to work back and forth over a toothed segment L, which is engaged by a pawl M, pivoted in the opening K⁴ and normally held in engagement with the toothed segment by means of a spring N.

The handles O are attached to the central beam by means of the same bolt which serves as a pivot for the lever K, said handles being braced by means of bars O', extending from the rear end of the main beam A to the said handles O, as most clearly shown in Fig. 1.

Whenever it is desired to increase the width of the harrow, the lever K is thrown forwardly, thereby projecting its lower end rearwardly, and this action spreads the links I, which in turn shift the bars G and also spread the side beams C. Each shifting bar being parallel with its adjacent side beam, it is manifest that as the side beams are opened or closed the angle of the cultivator-tooth is shifted or changed, so that as the harrow or cultivator is widened the individual furrows cut by each tooth will be widened. Brace-beams D permit the adjustment of the side beams and serve to steady their movements.

Having thus fully described my invention, what I claim as new, and desire to secure by Letters Patent of the United States, is—

1. A cultivator comprising side beams provided with a series of pivoted teeth, the arms connected to the said teeth, the shift-bar connecting the said arms, and the lever for operating the said shift-bar, substantially as described.

2. A combined harrow and cultivator comprising a central beam, the side beams, the cultivator-teeth having their shanks pivoted in the said side beams, the arms connected to the said shanks, the shifting bars connected to the said arms, the operating-lever pivoted to the central beam, and the links connecting said lever and shifting bars, substantially as described.

3. In a combined harrow and cultivator the combination with the central beam, of the side beams capable of adjustment, the lever pivoted in the central beam, the links connected to the lower end of the said lever, the shifting bars connected to the said links, the arms connected to the shifting bars, and the cultivator-teeth having their shanks passing through the side beams and also through the arms and means for locking the lever in any adjusted position, substantially as described.

SAMUEL R. STEWART.

Witnesses:
D. H. STERNE,
G. W. JOHNSON.